US011804687B2

(12) United States Patent
Sugawara

(10) Patent No.: US 11,804,687 B2
(45) Date of Patent: Oct. 31, 2023

(54) BRAID FOLDING-BACK APPARATUS FOR END PORTION OF COAXIAL ELECTRIC WIRE

(71) Applicants: Yazaki Corporation, Tokyo (JP); JAPAN CHAIN TERMINAL CO., LTD., Tendo (JP)

(72) Inventor: Daisuke Sugawara, Tendo (JP)

(73) Assignees: YAZAKI CORPORATION, Tokyo (JP); JAPAN CHAIN TERMINAL CO., LTD., Tendo (JP)

(*) Notice: Subject to any disclaimer, the term of this patent is extended or adjusted under 35 U.S.C. 154(b) by 797 days.

(21) Appl. No.: 16/912,871

(22) Filed: Jun. 26, 2020

(65) Prior Publication Data
US 2020/0412075 A1 Dec. 31, 2020

(30) Foreign Application Priority Data
Jun. 28, 2019 (JP) ................ 2019-122297

(51) Int. Cl.
*H01R 43/28* (2006.01)
*H02G 1/12* (2006.01)
*H01B 13/00* (2006.01)

(52) U.S. Cl.
CPC ......... *H01R 43/28* (2013.01); *H01B 13/0016* (2013.01); *H02G 1/1248* (2013.01); *H02G 1/1292* (2013.01)

(58) Field of Classification Search
CPC .... H01R 43/28; H02G 1/1248; H02G 1/1265; H02G 1/1292; H02G 1/14; B21F 5/00; B21F 5/005; B21F 13/00; H01B 13/0016; Y10T 29/49192
See application file for complete search history.

(56) References Cited

U.S. PATENT DOCUMENTS

| 4,719,697 | A | * | 1/1988 | Schwartzman | ........ | H01R 43/05 81/9.51 |
| 6,776,196 | B2 | * | 8/2004 | Yamakawa | ........... | H01R 43/05 140/71 R |
| 7,395,592 | B2 | * | 7/2008 | Matsumura | ........... | H01R 43/28 29/33 F |
| 7,467,463 | B2 | * | 12/2008 | Matsuoka | ............. | H01R 43/28 29/857 |
| 8,872,028 | B2 | * | 10/2014 | Ito | ......................... | H02G 15/08 29/869 |

(Continued)

FOREIGN PATENT DOCUMENTS

| CN | 109792136 A | 5/2019 |
| JP | 2001357959 A | 12/2001 |
| JP | 2001357960 A | 12/2001 |

OTHER PUBLICATIONS

JP 2000-102133, Fujita et al. Apr. 2000.*

*Primary Examiner* — Edward T Tolan
(74) *Attorney, Agent, or Firm* — Sughrue Mion, PLLC

(57) ABSTRACT

An opening and closing drive mechanism allows the ring-shaped claw portions on the outer peripheries of the opening rollers to press against the base end portion of the exposed braid via the opening and closing blocks, in this state, the rotation body is rotated by the rotation drive mechanism, and the opening rollers attached to the opening and closing blocks revolve around the outer periphery of the braid, so that the tip end side of the exposed braid is opened outward in a radial direction.

5 Claims, 12 Drawing Sheets

(56) References Cited

U.S. PATENT DOCUMENTS

| | | | |
|---|---|---|---|
| 9,906,005 B2 * | 2/2018 | Baldauf | ................ H02G 1/1297 |
| 10,840,680 B2 * | 11/2020 | Houser | ................ H02G 1/1265 |
| 11,018,483 B2 * | 5/2021 | Houser | ................ H02G 1/1265 |
| 11,342,732 B2 * | 5/2022 | Boccato | ............. H01B 13/0036 |
| 2019/0318850 A1 | 10/2019 | Ogino et al. | |

* cited by examiner

BRAID FOLDING-BACK APPARATUS FOR END PORTION OF COAXIAL ELECTRIC WIRE

CROSS REFERENCE TO RELATED APPLICATIONS

This application is based on and claims priority from Japanese patent application No. 2019-122297 filed on Jun. 28, 2019, the entire contents of which are incorporated herein by reference.

BACKGROUND OF THE INVENTION

1. Technical Field

The present invention relates to a braid folding-back apparatus for an end portion of a coaxial electric wire.

2. Background Art

A common coaxial electric wire includes a core wire, an inner coat that covers an outer periphery of the core wire, a braid that covers an outer periphery of the inner coat, and an outer sheath that covers an outer periphery of the braid. For example, when a coaxial electric wire terminal is attached to an end portion of this type of coaxial electric wire, an outer sheath of a predetermined length is peeled off from an electric wire end portion to expose a braid, the exposed braid is folded back to cover the outer sheath, and a shield terminal is crimped to the folded-back portion.

As an automatic apparatus for folding the exposed braid back, a braid folding-back apparatus as exemplified in Patent Literature 1 is known.

The braid folding-back apparatus described in Patent Literature 1 includes a unit (first braid opening unit) that opens a tip end side of an exposed braid outward in a radial direction by pressing a pair of opening claws against a base end portion of the exposed braid from an outer diameter direction. Further, a unit (second braid opening unit) is provided which further opens the braid by allowing an opening pipe to enter, along an outer periphery of an inner coat, into an inner side of the braid whose tip end side is opened. Further, a braid folding-back unit is provided which bends the braid at a tip end position of an outer sheath and folds the braid back to cover the outer sheath by allowing a folding-back member to advance along an outer periphery of the opening pipe.

CITATION LIST

Patent Literature

[Patent Document 1] JP-A-2001-357960

SUMMARY

Technical Problem

In the braid folding-back apparatus described in Patent Literature 1, the pair of opening claws are pressed against the braid at a fixed position in a circumferential direction centered on a coaxial electric wire. Therefore, the braid is likely to be uneven in a circumferential direction due to a pressing force received from the opening claws. In particular, when the coaxial electric wire is not completely cylindrical, large unevenness is likely to occur. Therefore, the braid is not opened evenly in the circumferential direction. When folding-back is performed in the state, the unevenness occurs in the folded-back braid. As a result, reliability of electrical contact when the terminal is crimped to the folded-back braid may be reduced.

The present invention has been made in view of the above circumstances, and an object of the present invention is to provide a braid folding-back apparatus for an end portion of a coaxial electric wire that can evenly fold a braid back without unevenness in a circumferential direction.

Solution to Problem

In order to achieve the above object, the braid folding-back apparatus for the end portion of the coaxial electric wire according to the present invention is characterized by the following (1) to (5).

(1) A braid folding-back apparatus for an end portion of a coaxial electric wire in which an outer sheath of a predetermined length is peeled off from an electric wire end portion and an exposed braid is folded back to cover the outer sheath, the coaxial electric wire including a core wire, an inner coat that covers an outer periphery of the core wire, the braid that covers an outer periphery of the inner coat, and the outer sheath that covers an outer periphery of the braid, the braid folding-back apparatus for the end portion of the coaxial electric wire comprising:

a first braid opening unit configured to open a tip end side of the exposed braid outward in a radial direction by pressing opening claws against a base end portion of the exposed braid from an outer diameter direction;

a second braid opening unit configured to further open the braid by allowing an opening pipe to enter, along the outer periphery of the inner coat from the electric wire end portion side, into an inner side of the braid whose tip end side is opened; and a braid folding-back unit configured to bend the braid at a tip end position of the outer sheath and fold the braid back to cover the outer sheath by allowing the folding-back member to advance from a tip end side to a base end side of the coaxial electric wire along an outer periphery of the opening pipe, wherein the first braid opening unit includes a unit main body having a work axis that coincides with an axis of the end portion of the coaxial electric wire held at a fixed position for working, a rotation body rotatably mounted on the unit main body around the work axis, a rotation drive mechanism configured to be driven to rotate the rotation body, a plurality of opening and closing blocks arranged on the rotation body at equal angular intervals in a circumferential direction centered on the work axis, and slidably supported on the rotation body in a radial direction of a circle centered on the work axis, an opening and closing drive mechanism configured to synchronously open the plurality of opening and closing blocks outward in a radial direction and to synchronously close the plurality of opening and closing blocks inward in the radial direction, and a plurality of opening rollers rotatably attached to the opening and closing blocks respectively around axes parallel to the work axis and provided with ring-shaped claw portions serving as the opening claws on an outer periphery, and wherein the opening and closing drive mechanism allows the ring-shaped claw portions on the outer peripheries of the opening rollers to press against the base end portion of the exposed braid via the opening and closing blocks, in this state, the rotation body is rotated by the rotation drive mechanism, and the opening rollers attached to the opening and closing blocks revolve around the outer periphery of the braid, so that the tip end side of the exposed braid is opened outward in a radial direction.

(2) The braid folding-back apparatus for the end portion of the coaxial electric wire according to above (1), wherein three or more opening and closing blocks and three or more opening rollers are arranged at equal angular intervals in a circumferential direction centered on the work axis.

(3) The braid folding-back apparatus for the end portion of the coaxial electric wire according to above (1), wherein the unit main body is slidably mounted on the unit base in a direction parallel to the work axis, the first braid opening unit, a second braid opening unit, and the folding-back member of the braid folding-back unit are mounted on the unit main body, a unit main body drive mechanism that moves the unit main body forward and backward in a direction parallel to the work axis is provided between the unit base and the unit main body, and the unit main body drive mechanism corresponds to a drive mechanism of the braid folding-back unit that advances the folding-back member.

(4) The braid folding-back apparatus for the end portion of the coaxial electric wire according to above (3), wherein the second braid opening unit mounted on the unit main body includes a slide rod that penetrates the rotation body and is slidably disposed on the work axis while being guided by the rotation body, the opening pipe provided on a front end of the slide rod, and a slide drive mechanism that moves the slide rod forward and backward.

(5) The braid folding-back apparatus for the end portion of the coaxial electric wire according to above (4), wherein the rotation drive mechanism, the opening and closing drive mechanism, the slide drive mechanism, and the unit main body drive mechanism are respectively configured with air-driven actuators.

According to the braid folding-back apparatus for the end portion of the coaxial electric wire having the configuration of the above (1), the ring-shaped claw portions provided on the opening rollers are pressed against the base end portion of the braid from the outer diameter direction, and the opening rollers revolve around the outer periphery of the braid. Therefore, a pressing force can be evenly applied to an entire periphery of the braid, and the braid can be evenly opened without unevenness in a circumferential direction. Further, the opening rollers follow and rotate (self-rotate) while being in contact with the braid. Therefore, the opening rollers do not rub against the braid, the braid can be prevented from being frayed, and the braid can be opened neatly.

According to the braid folding-back apparatus for the end portion of the coaxial electric wire having the configuration of the above (2), three or more opening rollers are arranged at equal angular intervals in a circumferential direction. Therefore, the pressing force against the braid can be applied more evenly in the circumferential direction, and the braid can be opened neatly without generating distortion in the braid.

According to the braid folding-back apparatus for the end portion of the coaxial electric wire having the configuration of the above (3), when the unit main body is advanced with respect to the unit base, the folding-back member can be advanced for folding the braid back. Therefore, freedom of an arrangement of the unit main body drive mechanism can be ensured, and structural complexity can be reduced.

According to the braid folding-back apparatus for the end portion of the coaxial electric wire having the configuration of the above (4), since the slide drive mechanism for advancing the opening pipe can be disposed behind the rotation body, a structure is simplified.

According to the braid folding-back apparatus for the end portion of the coaxial electric wire having the configuration of the above (5), since all the drive mechanisms are configured with the air-driven actuators, simplification of a structure, as well as ease of operation and control can be ensured.

Advantageous Effects of Invention

According to the braid folding-back apparatus for the end portion of the coaxial electric wire in the present invention, the opening rollers that can self-rotate or revolve around the coaxial electric wire are used as the opening claws. Therefore, the braid can be folded back evenly without unevenness in the circumferential direction.

The present invention has been briefly described above. Details of the present invention are further clarified by reading a mode for carrying out the invention (hereinafter, referred to as "embodiment") described below with reference to the attached drawings.

DETAILED DESCRIPTION OF EMBODIMENTS

A specific embodiment according to the present invention will be described below with reference to the drawings.

Figure 1:
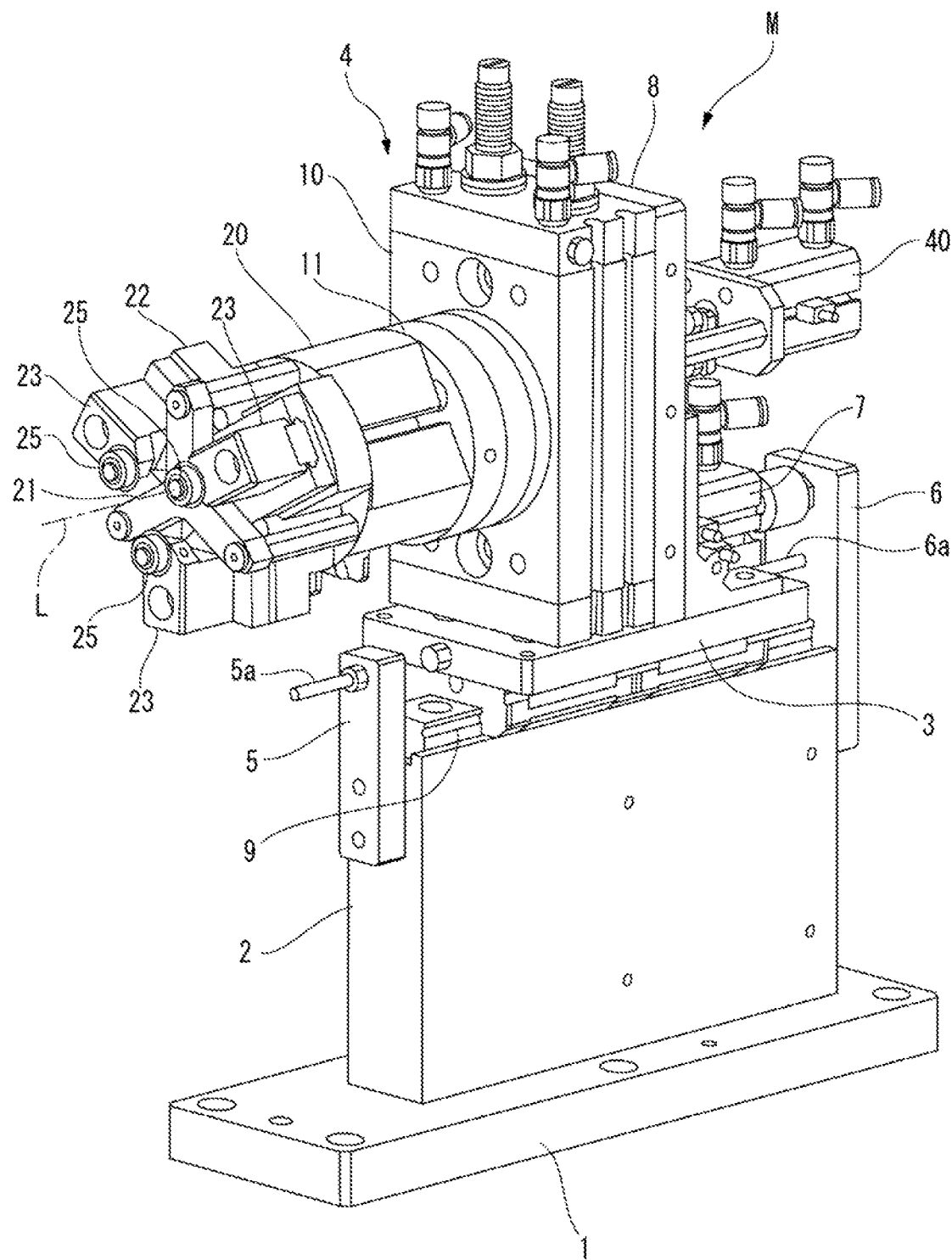
FIG. 1 is an external perspective view of a braid folding-back apparatus for an end portion of a coaxial electric wire according to an embodiment of the present invention.
Figure 2:
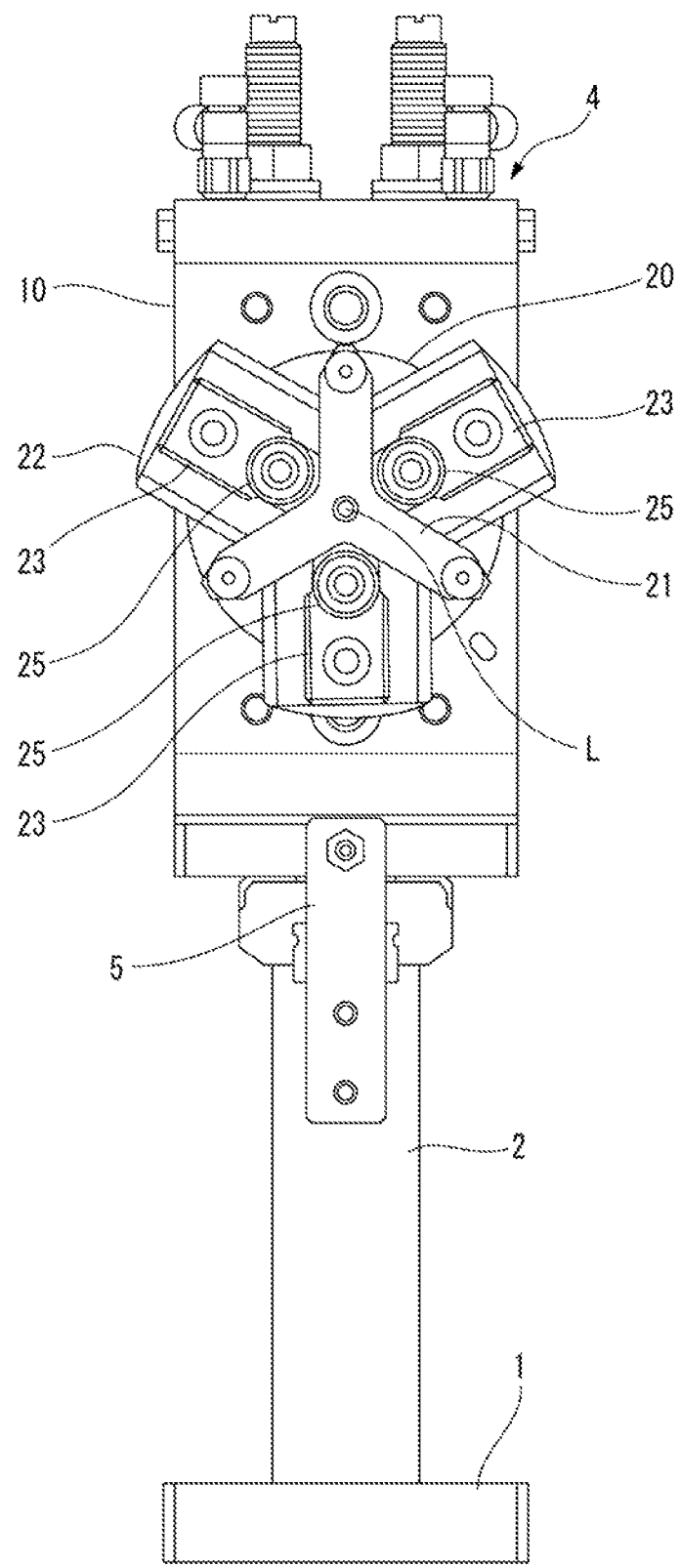
FIG. 2 is a front view of the braid folding-back apparatus according to the embodiment of the present invention.
Figure 3:
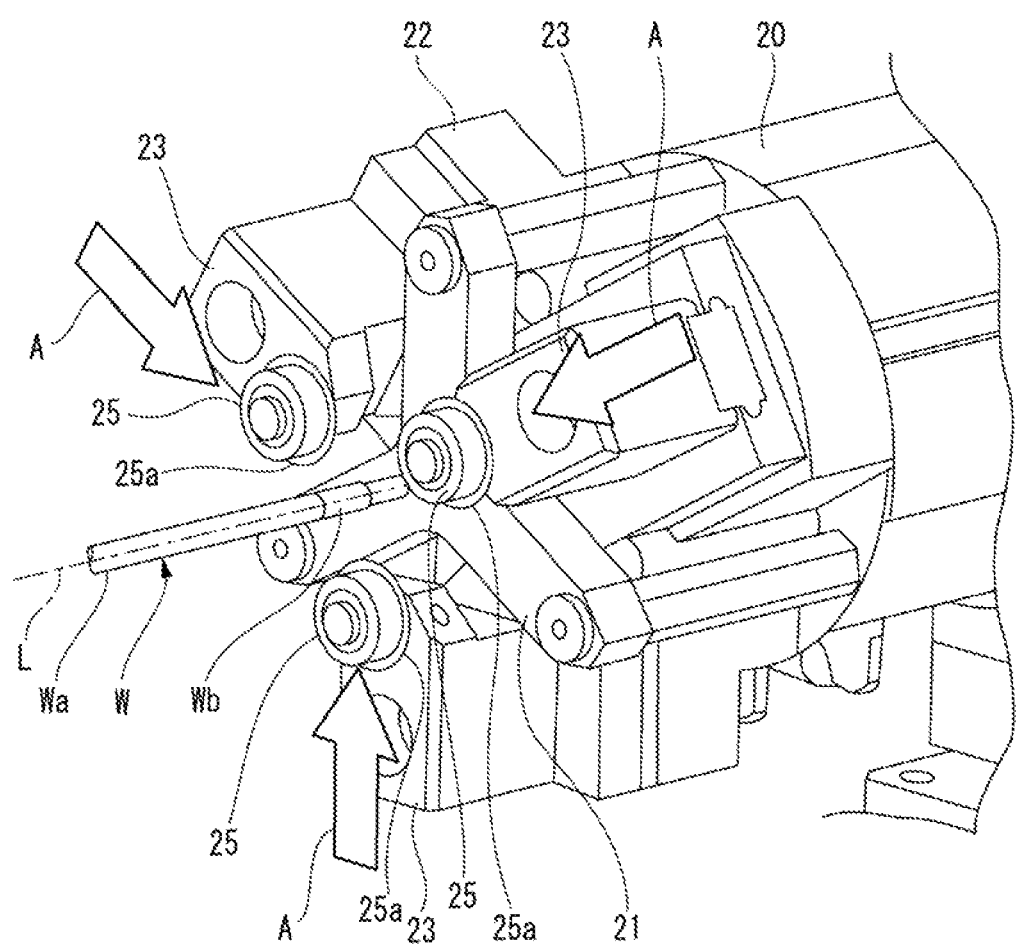
FIG. 3 is a perspective view of main parts showing a state of the braid folding-back apparatus according to the embodiment of the present invention when work is started.
Figure 4:
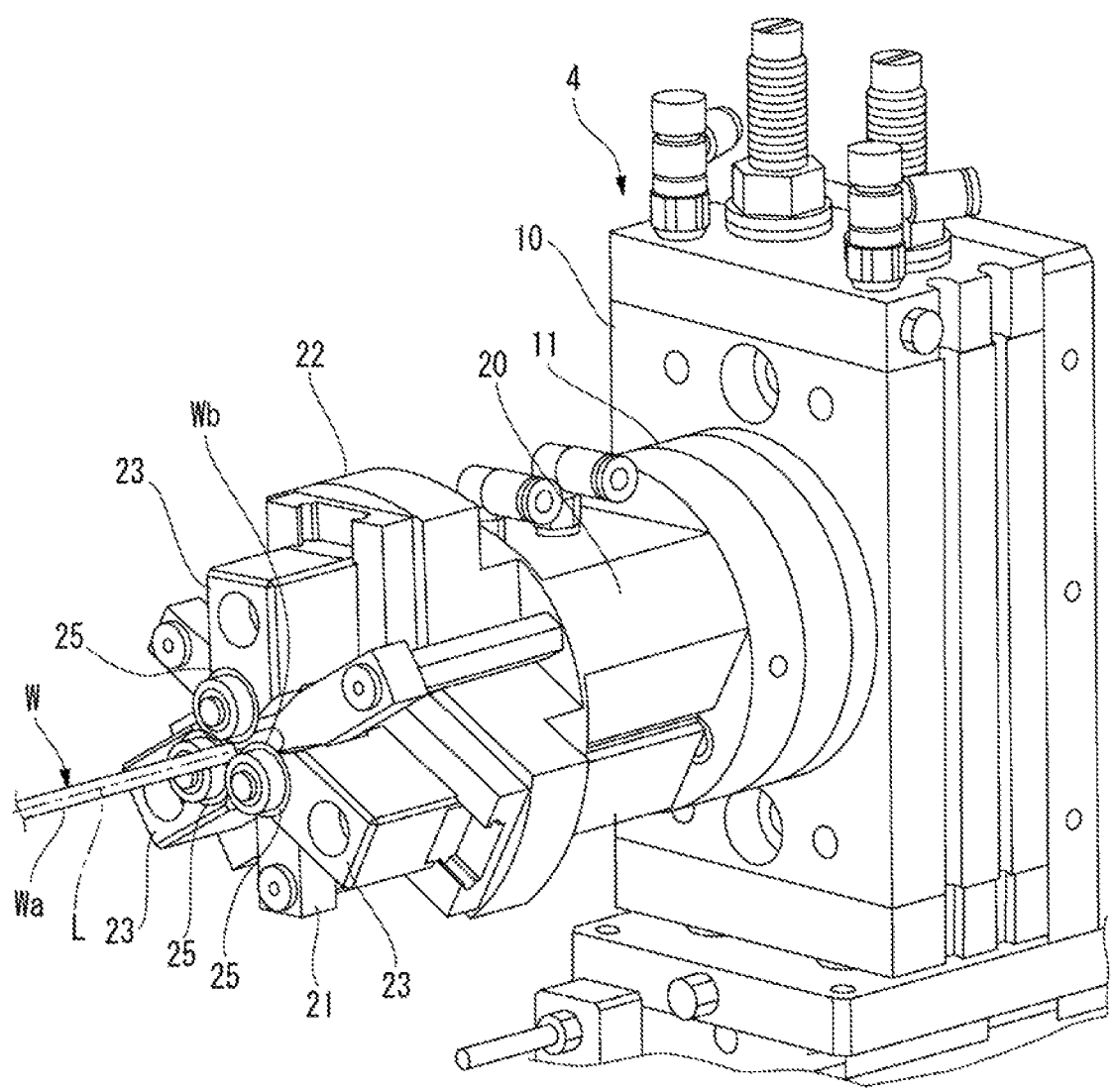
FIG. 4 is a perspective view of main parts showing a state where opening rollers are pressed against a base end portion of a braid of the coaxial electric wire in the braid folding-back apparatus.
Figure 5:
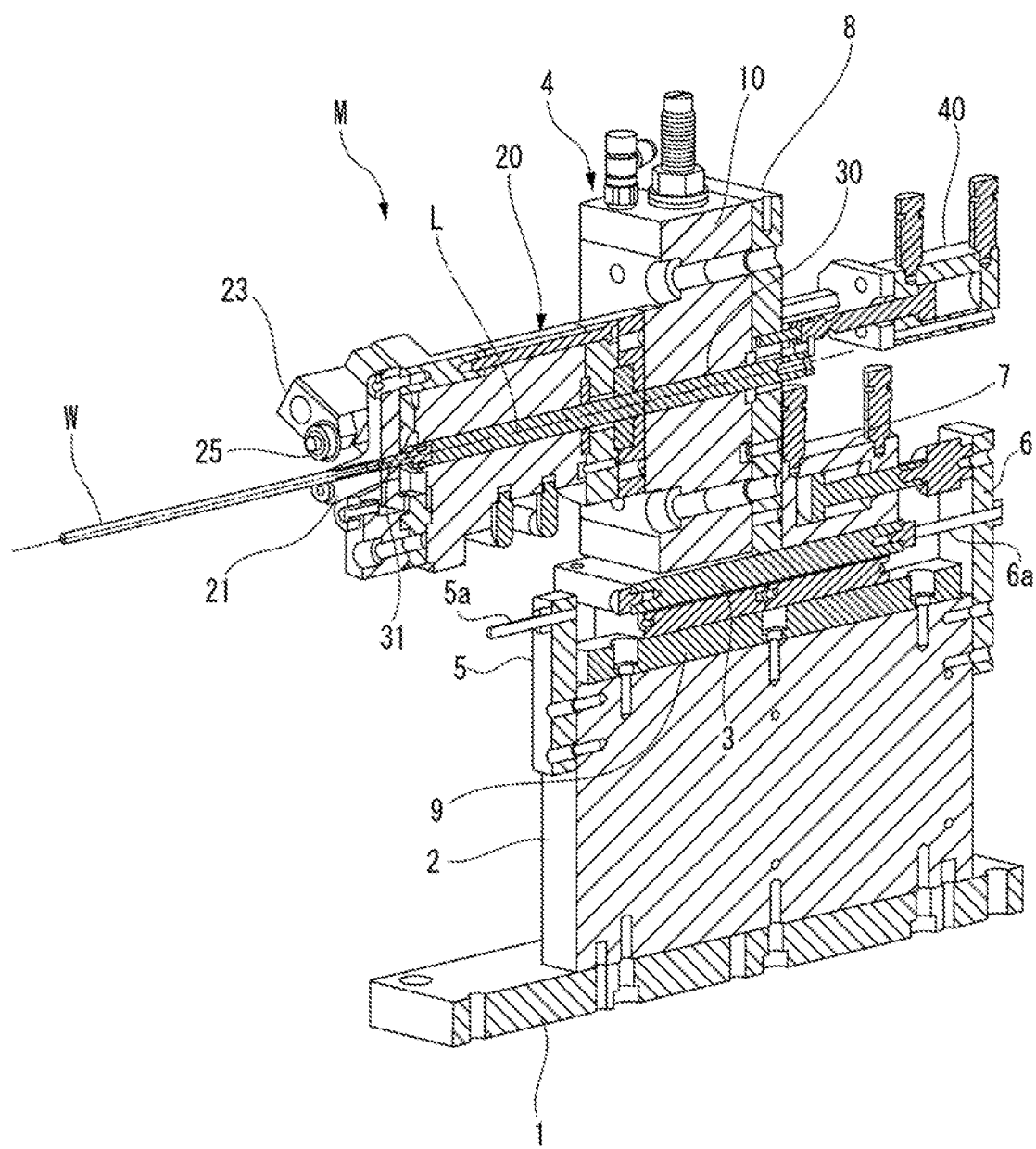
FIG. 5 is a perspective longitudinal cross-sectional view showing an overall configuration of the braid folding-back apparatus according to the embodiment of the present invention.
Figure 6:
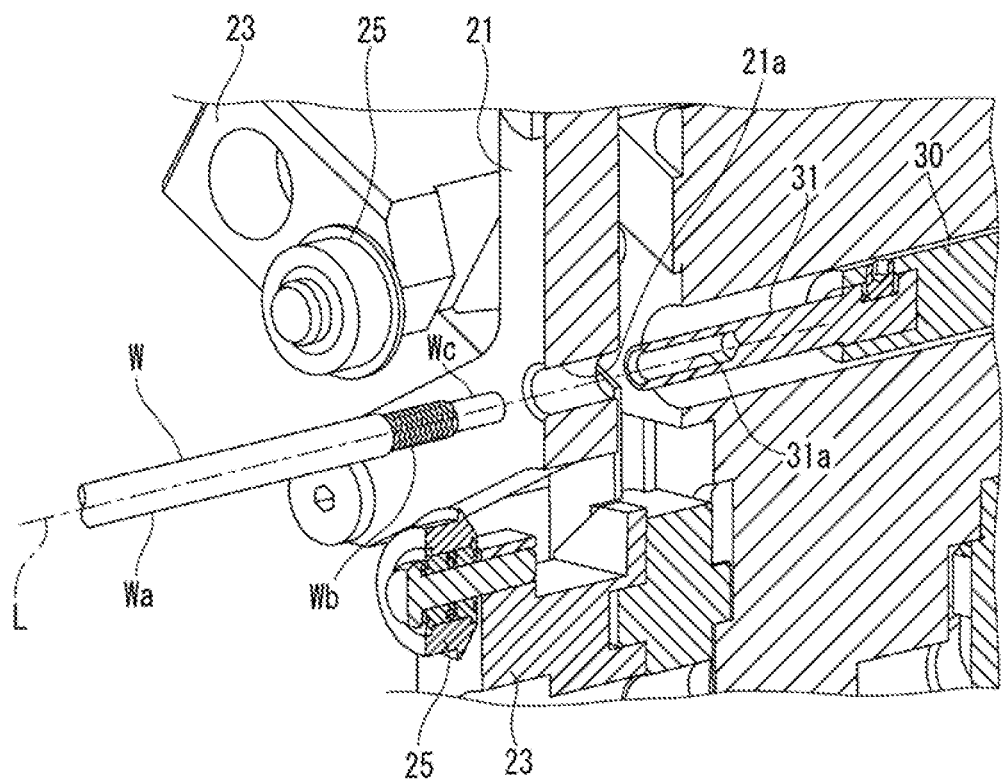
FIG. 6 is a perspective cross-sectional view of main parts showing a relationship among the coaxial electric wire, an opening pipe, and a folding-back member in the braid folding-back apparatus.
Figure 7:
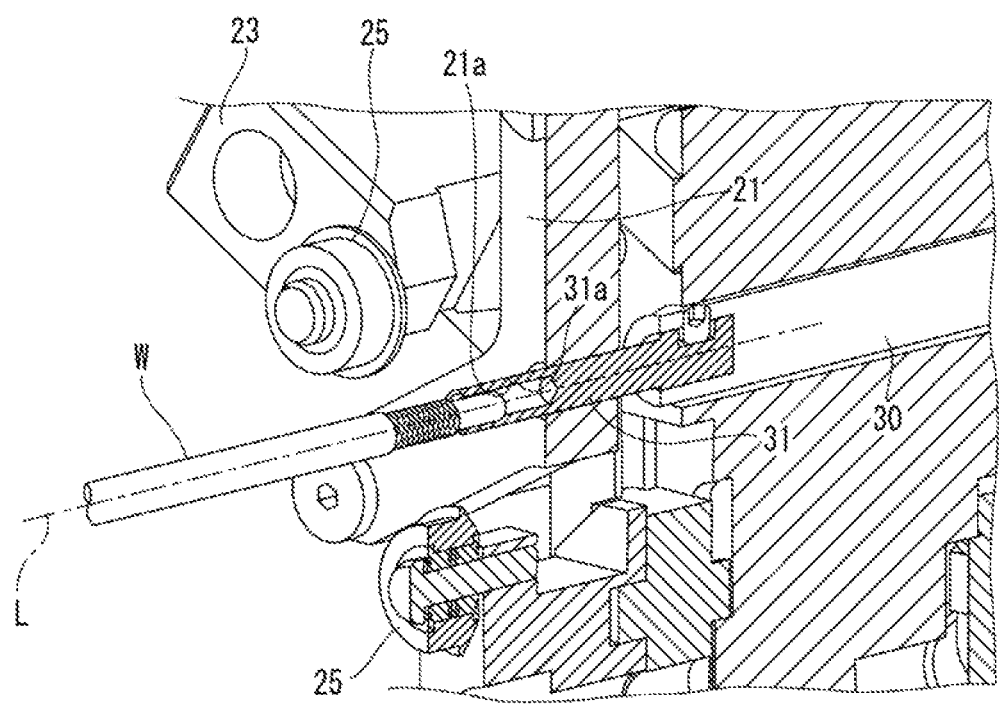
FIG. 7 is a perspective cross-sectional view of main parts showing a state where the opening pipe is advanced with respect to the coaxial electric wire in the braid folding-back apparatus.

FIG. 1 is an external perspective view of a braid folding-back apparatus for an end portion of a coaxial electric wire according to the present embodiment. FIG. 2 is a front view. FIG. 3 is a perspective view of main parts showing a state when work is started. FIG. 4 is a perspective view of main parts showing a state where opening rollers are pressed against a base end portion of a braid of the coaxial electric wire. Further, FIG. 5 is a perspective longitudinal cross-sectional view showing an overall configuration of the braid folding-back apparatus. FIG. 6 is a perspective cross-sectional view of main parts showing a relationship among the coaxial electric wire, an opening pipe, and a folding-back member. FIG. 7 is a perspective cross-sectional view of main parts showing a state where the opening pipe is advanced with respect to the coaxial electric wire. Further, FIGS. 8 to 12 are schematic views for illustrating operation.

Figure 8:
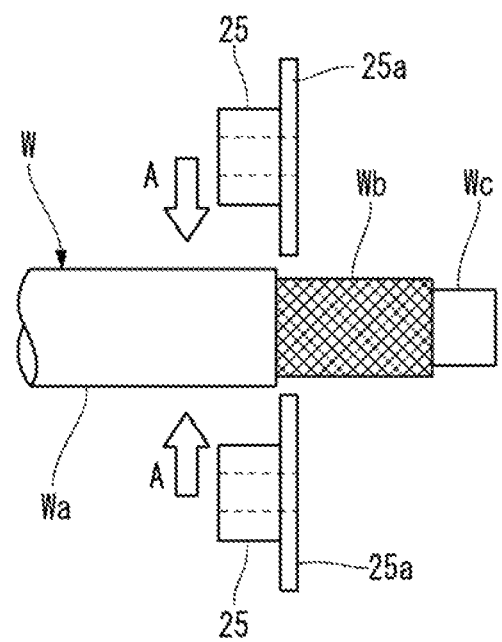
FIG. 8 is an operation illustrative view of the braid folding-back apparatus, and is a schematic view showing a state where ring-shaped claw portions on outer peripheries of the opening rollers are pressed against the base end portion of the braid of the coaxial electric wire.

As shown in FIG. 8, here a coaxial electric wire W to be worked includes a core wire (not shown), an inner coat (dielectric) Wc that covers an outer periphery of the core wire, a braid Wb that covers an outer periphery of the inner coat Wc, and an outer sheath (insulating coating) Wa that covers an outer periphery of the braid Wb.

Figure 12:
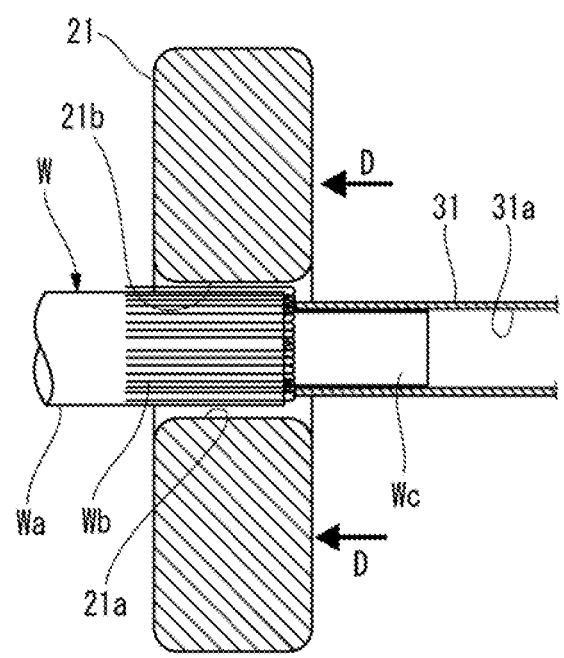
FIG. 12 is an operation illustrative view of a next stage of FIG. 11, and is a schematic view showing a state where the braid has been folded back by advancing the folding-back member.

A braid folding-back apparatus M (FIG. 1) in the present embodiment is a processing apparatus for an end portion of the coaxial electric wire W having such a structure. As shown in FIG. 8, the braid folding-back apparatus M is an apparatus for folding back an exposed braid Wb of the end portion of the coaxial electric wire W, which is set in a state where the outer sheath Wa of a predetermined length is peeled off from an electric wire end portion and the braid Wb is exposed, to cover the outer sheath Wa as shown in FIG. 12.

As shown in FIGS. 1 to 7, the braid folding-back apparatus M includes a base plate 1, a unit base 2 erected on the base plate 1, a slide plate 3 mounted on the unit base 2 via a guide mechanism (LM guide) 9 in a linear slidable manner, a unit main body 4 mounted on the slide plate 3, and a unit main body drive mechanism 7 that allows the unit main body 4 to slide.

The end portion of the coaxial electric wire W to be worked is transported by a transport mechanism (not shown), and is held at a fixed position for the braid folding-back apparatus M to work by a support mechanism (not shown).

In the unit main body 4, a work axis L is set which coincides with an axis of the end portion of the coaxial electric wire W held at a fixed position for working, and a sliding direction of the unit main body 4 is set in a direction parallel to the work axis L. A front stopper plate 5 and a rear stopper plate 6 are respectively attached to a front end and a rear end of the unit base 2. Stopper screws 5a and 6a respectively attached to the front stopper plate 5 and the rear stopper plate 6 limit a movement of the slide plate 3, that is, the unit main body 4 in a front-rear direction (see FIG. 5).

A stay plate 8 formed of a vertical plate is fixed to an upper portion of the slide plate 3, and the unit main body drive mechanism 7 for allowing the unit main body 4 to advance or retract is connected between the stay plate 8 and the rear stopper plate 6. Here, the advance refers to a movement in a direction approaching the end portion of the coaxial electric wire W, and the retraction refers to a movement in a direction away from the end portion of the coaxial electric wire W. The unit main body drive mechanism 7 is configured with a reciprocating air cylinder (air-driven actuator).

A first braid opening unit, a second braid opening unit, and the folding-back member that is an element of a braid folding-back unit, which will be described in detail below, are mounted on the unit main body 4.

Figure 9:
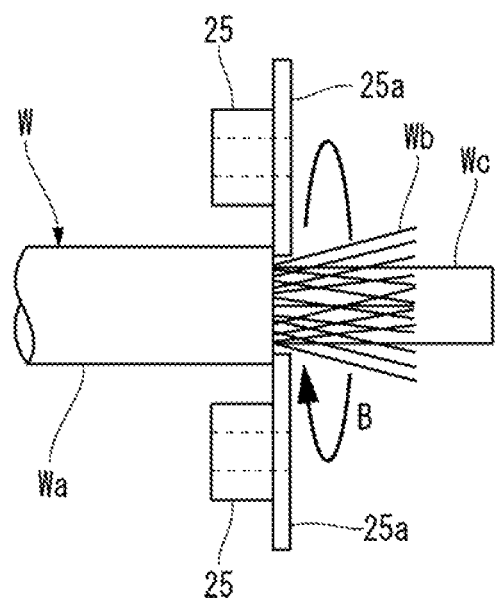
FIG. 9 is an operation illustrative view of a next stage of FIG. 8, and is a schematic view showing a state where a tip end side of the braid is opened by pressing the ring-shaped claw portions on the outer peripheries of the opening rollers against the base end portion of the braid of the coaxial electric wire and by rotating the opening rollers.

Here, as shown in FIGS. 8 and 9, the first braid opening unit means a unit that opens a tip end side of the exposed braid Wb outward in a radial direction by pressing opening claws (ring-shaped claw portions 25a of opening rollers 25 to be described below) against a base end portion of the exposed braid Wb of the end portion of the coaxial electric wire W from an outer diameter direction.

Figure 10:
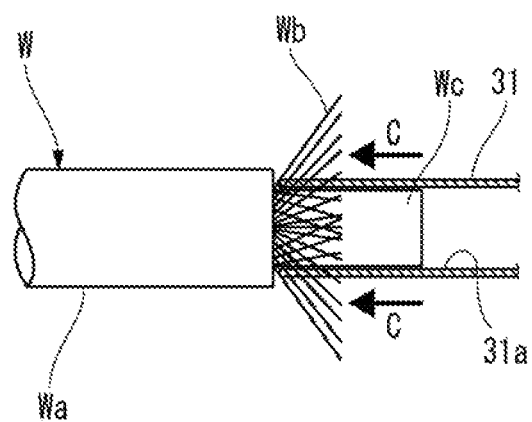
FIG. 10 is an operation illustrative view of a next stage of FIG. 9, and is a schematic view showing a state where the braid is further opened by advancing the opening pipe.
Figure 11:
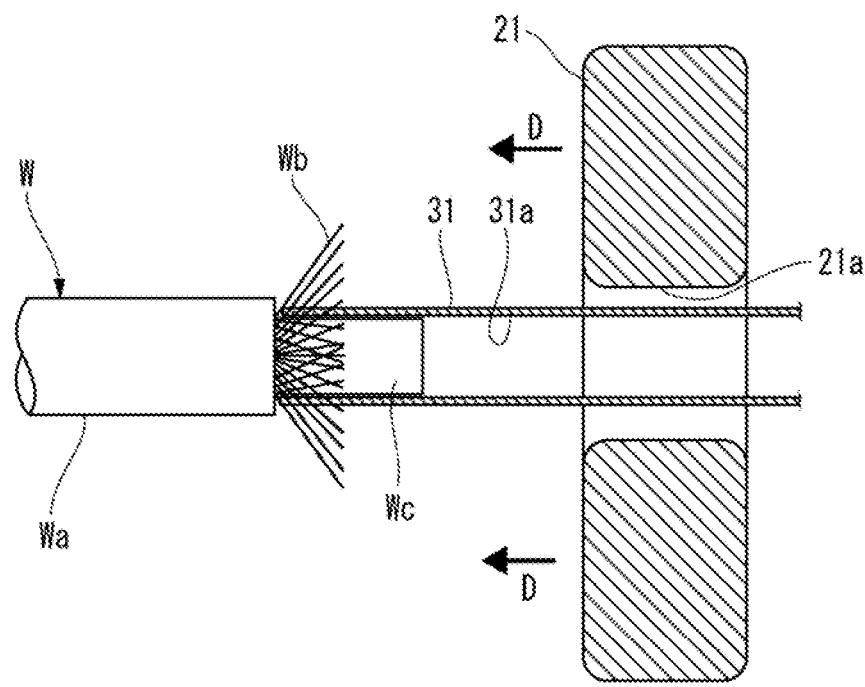
FIG. 11 is an operation illustrative view of a next stage of FIG. 10, and is a schematic view showing a state before the braid is folded back by advancing the folding-back member.

As shown in FIGS. 10 and 11, the second braid opening unit means a unit that further opens the braid Wb by allowing an opening pipe 31 to enter, along the outer periphery of the inner coat Wc from an electric wire end portion side, into an inner side of the braid Wb whose tip end side is opened.

As shown in FIGS. 11 and 12, the braid folding-back unit means a unit that bends the braid Wb at a tip end position of the outer sheath Wa and folds the braid Wb back to cover the outer sheath Wa by allowing the folding-back member 21 to advance from a tip end side to a base end side of the coaxial electric wire W along an outer periphery of the opening pipe 31.

The folding-back member 21 that is an element of the braid folding-back unit is mounted on the unit main body 4, and the unit main body drive mechanism 7 provided between the unit main body 4 and the unit base 2 (stay plate 8 and rear stopper plate 6) corresponds to a drive mechanism of the braid folding-back unit that allows the folding-back member 21 to advance and retract.

This will be described in more detail below.

As shown in FIGS. 1 to 7, in the braid folding-back apparatus M in the present embodiment, the first braid opening unit includes a rotation body 11 and a rotation drive mechanism 10 thereof, a plurality of opening and closing blocks 23 and an opening and closing drive mechanism 20 thereof, and a plurality of opening rollers 25 attached to the opening and closing blocks 23.

A main body portion of an air-driven rotary actuator serving as the rotation drive mechanism 10 is fixed to a front surface of the stay plate 8 of the unit main body 4. The rotation body 11 is provided as a rotation portion of the rotary actuator and is driven to rotate around the work axis L.

A main body portion of an air-driven air chuck serving as the opening and closing drive mechanism 20 is fixed to the rotation body 11. An opening and closing block support frame 22 is provided on a front end of the main body portion of the air chuck, and the plurality of (three in the present embodiment) opening and closing blocks 23 are provided on the opening and closing block support frame 22 at equal angular intervals in a circumferential direction centered on the work axis L. Since the rotation body 11 that is the rotation portion of the rotary actuator, the main body portion of the air-driven air chuck serving as the opening and closing drive mechanism 20, and the opening and closing block support frame 22 rotate integrally, an entirety of which may be also referred to as a rotation body. The folding-back member 21, which is an element of the braid folding-back unit, is fixed to the opening and closing block support frame 22 in such a mode as not to interfere with the opening and closing blocks 23.

The three opening and closing blocks 23 are supported on the opening and closing block support frame 22 to be slidable in a radial direction of a circle centered on the work axis L. The main body portion of the air-driven air chuck serving as the opening and closing drive mechanism 20 synchronously opens the plurality of opening and closing blocks 23 outward in the radial direction and synchronously closes the plurality of opening and closing blocks 23 inward in the radial direction.

The opening roller 25 is attached to an inner end portion of each opening and closing block 23 in a radial direction to be rotatable around an axis parallel to the work axis L. An outer periphery of each opening roller 25 is provided with the ring-shaped claw portion 25a serving as an opening claw.

As shown in FIG. 5, in the braid folding-back apparatus M in the present embodiment, the second braid opening unit includes a slide rod 30 that penetrates the rotation body (rotation drive mechanism 10, opening and closing drive mechanism 20, opening and closing block support frame 22, and the like) and is slidably disposed on the work axis L while being guided by the rotation body, an opening pipe 31 provided on a front end of the slide rod 30, and a slide drive mechanism 40 that moves the slide rod 30 forward and backward. The slide rod 30 also penetrates the stay plate 8, and a reciprocating air cylinder serving as the slide drive mechanism 40 is disposed on a rear side of the stay plate 8.

As shown in FIGS. 6 and 7, a rear end side of the opening pipe 31 is solid, and the solid portion is fixed to a front end of the slide rod 30 by a setscrew. In the opening pipe 31, an inner diameter of a hole 31a is set to a size by which the inner coat Wc of the coaxial electric wire W is inserted, and an outer diameter of the hole 3a is set to a size by which a center hole 21a of the folding-back member 21 is to be inserted. Further, the center hole 21a of the folding-back member 21 is set to a diameter slightly larger than a diameter of the outer sheath Wa of the coaxial electric wire W.

In the braid folding-back apparatus M in the present embodiment, as described above, the rotation drive mechanism 10, the opening and closing drive mechanism 20, the slide drive mechanism 40, and the unit main body drive mechanism 7 are all configured with air-driven actuators.

Next, operation will be described.

When a braid folding-back processing is performed in the braid folding-back apparatus M in the present embodiment, the end portion of the coaxial electric wire W that has been processed in advance (processing in a mode shown in FIG. 8) is held at a fixed position for working by a support device (not shown). Then, the opening and closing drive mechanism 20 is operated to a closing side to close the opening rollers 25 as indicated by arrows A in FIGS. 3 and 8. The ring-shaped claw portions 25a of the opening rollers 25 are pressed against the base end portion of the exposed braid Wb as shown in FIGS. 4 and 9. An air pressure of the opening and closing drive mechanism 20 is controlled, so that the rotation drive mechanism 10 is operated to allow the opening rollers 25 to revolve around the outer periphery of the braid Wb by 180° as indicated by an arrow B while an appropriate pressing force is pressed.

Then, the tip end side of the exposed braid Wb is opened outward in the radial direction. Here, the pressing force of the ring-shaped claw portions 25a of the opening rollers 25 is set to such an extent that the base end portion of the braid Wb is slightly pressed into the inner coat Wc. When a pressing force is too weak, the braid Wb is not opened, and when the pressing force is too strong, the braid Wb may be damaged. Therefore, it is necessary to appropriately set the air pressure. Further, a tip end of the ring-shaped claw portion 25a of the opening roller 25 is formed in a smooth shape so that the braid W is not damaged.

Next, as shown in FIG. 10, the slide drive mechanism 40 is operated to advance, and the opening pipe 31 is allowed to enter as indicated by arrows C, along the outer periphery of the inner coat Wc from the electric wire end portion side, into the inner side of the braid Wb whose the tip end side is opened. Accordingly, the braid Wb can be further opened by the opening pipe 31. A tip end of the opening pipe 31 is also formed in a smooth shape so that the braid W is not damaged.

Next, the opening and closing drive mechanism 20 is operated to an opening side to retract the opening rollers 25 to an opening position, and then the unit main body drive mechanism 7 is operated to advance and the unit main body 4 is advanced. Then, as indicated by arrows D in FIGS. 11 and 12, the folding-back member 21 advances from the tip end side to the base end side of the coaxial electric wire W along the outer periphery of the opening pipe 31. Accordingly, the braid Wb is bent at the tip end position of the outer sheath Wa, and the braid Wb is folded back to cover the outer sheath Wa. A hole edge of the center hole 21a of the folding-back member 21 is also formed in a smooth shape so that the braid W is not damaged.

After the folding-back processing is completed, the unit main body drive mechanism 7 and the slide drive mechanism 40 are operated to retract, the unit main body 4 and the opening pipe 31 (slide rod 30) are returned to original positions, and the processed end portion of the coaxial electric wire W is transferred to a next step.

As described above, according to the braid folding-back apparatus M in the present embodiment, the ring-shaped claw portions 25a provided on the opening rollers 25 are pressed against the base end portion of the braid Wb from the outer diameter direction, and the opening rollers 25 revolve around the outer periphery of the braid Wb. Therefore, the pressing force can be evenly applied to an entire periphery of the braid Wb, and the braid Wb can be evenly opened in a circumferential direction without unevenness. Further, the opening rollers 25 follow and rotate (self-rotate) while being in contact with the braid Wb. Therefore, the opening rollers 25 do not rub against the braid Wb, the braid Wb can be prevented from being frayed, and the braid Wb can be opened neatly.

According to the braid folding-back apparatus M in the present embodiment, three opening rollers 25 are arranged at equal angular intervals in a circumferential direction. Therefore, the pressing force against the braid Wb can be applied more evenly in a circumferential direction, and the braid Wb can be opened neatly without generating distortion in the braid Wb.

According to the braid folding-back apparatus M in the present embodiment, when the unit main body 4 is advanced with respect to the unit base 2, the folding-back member 21 is advanced for folding the braid Wb back. Therefore, freedom of an arrangement of the unit main body drive mechanism 7 can be ensured, and structural complexity can be reduced.

According to the braid folding-back apparatus M in the present embodiment, since the slide drive mechanism 40 for advancing the opening pipe 31 can be disposed behind the rotation body (rotation drive mechanism 10, opening and closing drive mechanism 20, opening and closing block support frame 22 and the like), a structure is simplified.

According to the braid folding-back apparatus M in the present embodiment, since all the drive mechanisms 7, 10, 20, and 40 are configured with air-driven actuators, simplification of a structure, as well as ease of operation and control can be ensured.

Although a case where the number of the opening and closing block 23 and the number of the opening roller 25 are three has been described in the above embodiment, the opening and closing block 23 and the opening roller 25 each may be plurally arranged at equal angular intervals in a circumferential direction centered on the work axis L, and the number of each may be two other than three or four or more.

Here, characteristics of the braid folding-back apparatus for the end portion of the coaxial electric wire according to the embodiment of the present invention described above will be briefly summarized in the following [1] to [5].

[1] A braid folding-back apparatus (M) for an end portion of a coaxial electric wire in which an outer sheath (Wa) of a predetermined length is peeled off from an electric wire end portion and an exposed braid (Wb) is folded back to cover the outer sheath (Wa), the coaxial electric wire (W) including a core wire, an inner coat (Wc) that covers an outer periphery of the core wire, the braid (Wb) that covers an outer periphery of the inner coat (Wc), and the outer sheath (Wa) that covers an outer periphery of the braid (Wb), the braid folding-back apparatus (M) for the end portion of the coaxial electric wire includes:

a first braid opening unit configured to open a tip end side of the exposed braid (Wb) outward in a radial direction by pressing opening claws against a base end portion of the exposed braid (Wb) from an outer diameter direction;

a second braid opening unit configured to further open the braid (Wb) by allowing an opening pipe (31) to enter, along the outer periphery of the inner coat (Wc) from the electric wire end portion side, into an inner side of the braid (Wb) whose tip end side is opened; and a braid folding-back unit configured to bend the braid (Wb) at a tip end position of the outer sheath (Wa) and fold the braid (Wb) back to cover the outer sheath by allowing the folding-back member (21) to advance from a tip end side to a base end side of the coaxial electric wire (W) along an outer periphery of the opening pipe (31), in which the first braid opening unit includes a unit main body (4) having a work axis (L) that coincides with an axis of the end portion of the coaxial electric wire (W) held at a fixed position for working, a rotation body (11) rotatably mounted on the unit main body (4) around the work axis (L), a rotation drive mechanism (10) configured to be driven to rotate the rotation body (11).

a plurality of opening and closing blocks (23) arranged on the rotation body (11) at equal angular intervals in a circumferential direction centered on the work axis (L), and slidably supported on the rotation body (11) in a radial direction of a circle centered on the work axis (L), an opening and closing drive mechanism (20) configured to synchronously open the plurality of opening and closing blocks (23) outward in a radial direction and to synchronously close the plurality of opening and closing blocks (23) inward in the radial direction, and a plurality of opening rollers (25) rotatably attached to the opening and closing blocks (23) respectively around axes parallel to the work axis (L) and provided with ring-shaped claw portions (25a) serving as the opening claws on an outer periphery, and in which the opening and closing drive mechanism (20) allows the ring-shaped claw portions (25a) on the outer peripheries of the opening rollers (25) to press against the base end portion of the exposed braid (Wb) via the opening and closing blocks (23), in this state, the rotation body (11) is rotated by the rotation drive mechanism (10), and the opening rollers (25) attached to the opening and closing blocks (23) revolve around the outer periphery of the braid (Wb), so that the tip end side of the exposed braid (Wb) is opened outward in a radial direction.

[2] The braid folding-back apparatus (M) for the end portion of the coaxial electric wire according to the above [1], in which three or more opening and closing blocks (23) and three or more opening rollers (25) are arranged at equal angular intervals in a circumferential direction centered on the work axis (L).

[3] The braid folding-back apparatus (M) for the end portion of the coaxial electric wire according to the above [1], in which the unit main body (4) is slidably mounted on the unit base (2) in a direction parallel to the work axis (L), the first braid opening unit, a second braid opening unit, and the folding-back member (21) of the braid folding-back unit are mounted on the unit main body (4), a unit main body drive mechanism (7) that moves the unit main body (4) forward and backward in a direction parallel to the work axis (L) is provided between the unit base (2) and the unit main body (4), and the unit main body drive mechanism (7) corresponds to a drive mechanism of the braid folding-back unit that advances the folding-back member (21).

[4] The braid folding-back apparatus (M) for the end portion of the coaxial electric wire according to the above [3], in which the second braid opening unit mounted on the unit main body (4) includes a slide rod (30) that penetrates the rotation body (11, 20, 22) and is slidably disposed on the work axis (L) while being guided by the rotation body (11, 20,22), the opening pipe (31) provided on a front end of the slide rod (30), and a slide drive mechanism (40) that moves the slide rod (30) forward and backward.

[5] The braid folding-back apparatus (M) for the end portion of the coaxial electric wire according to the above [4], in which the rotation drive mechanism (10), the opening and closing drive mechanism (20), the slide drive mechanism (40), and the unit main body drive mechanism (7) are respectively configured with air-driven actuators.

REFERENCE SINS LIST

25 OPENING ROLLER
25a RING-SHAPED CLAW PORTION
W COAXIAL ELECTRIC WIRE
Wa OUTER SHEATH
Wb BRAID
Wc INNER COAT

What is claimed is:

1. A braid folding-back apparatus for an end portion of a coaxial electric wire in which an outer sheath of a predetermined length is peeled off from an electric wire end portion and an exposed braid is folded back to cover the outer sheath, the coaxial electric wire including a core wire, an inner coat that covers an outer periphery of the core wire, the braid that covers an outer periphery of the inner coat, and the outer sheath that covers an outer periphery of the braid, the braid folding-back apparatus for the end portion of the coaxial electric wire comprising:

a first braid opening unit configured to open a tip end side of the exposed braid outward in a radial direction by pressing opening claws against a base end portion of the exposed braid from an outer diameter direction;

a second braid opening unit configured to further open the braid by allowing an opening pipe to enter, along the outer periphery of the inner coat from the electric wire end portion side, into an inner side of the braid whose tip end side is opened; and a braid folding-back unit configured to bend the braid at a tip end position of the outer sheath and fold the braid back to cover the outer sheath by allowing the folding-back member to advance from a tip end side to a base end side of the coaxial electric wire along an outer periphery of the opening pipe, wherein the first braid opening unit includes a unit main body having a work axis that coincides with an axis of the end portion of the coaxial electric wire held at a fixed position for working, a rotation body rotatably mounted on the unit main body around the work axis, a rotation drive mechanism configured to be driven to rotate the rotation body, a plurality of opening and closing blocks arranged on the rotation body at equal angular intervals in a circumferential direction centered on the work axis, and slidably supported on the rotation body in a radial direction of a circle centered on the work axis, an opening and closing drive mechanism configured to synchronously open the plurality of opening and closing blocks outward in a radial direction and to synchronously close the plurality of opening and closing blocks inward in the radial direction, and a plurality of opening rollers rotatably attached to the opening and closing blocks respectively around axes parallel to the work axis and provided with ring-shaped claw portions serving as the opening claws on an outer periphery, and wherein the opening and closing drive mechanism allows the ring-shaped claw portions on the outer peripheries of the opening rollers to press against the base end portion of the exposed braid via the opening and closing blocks, in this state, the rotation body is rotated by the rotation drive mechanism, and the opening rollers attached to the opening and closing blocks revolve around the outer periphery of the braid, so that the tip end side of the exposed braid is opened outward in a radial direction.

2. The braid folding-back apparatus for the end portion of the coaxial electric wire according to claim 1, wherein three or more opening and closing blocks and three or more opening rollers are arranged at equal angular intervals in a circumferential direction centered on the work axis.

3. The braid folding-back apparatus for the end portion of the coaxial electric wire according to claim 1, wherein the unit main body is slidably mounted on the unit base in a direction parallel to the work axis, the first braid opening unit, a second braid opening unit, and the folding-back member of the braid folding-back unit are mounted on the unit main body, a unit main body drive mechanism that moves the unit main body forward and backward in a direction parallel to the work axis is provided between the unit base and the unit main body, and the unit main body drive mechanism corresponds to a drive mechanism of the braid folding-back unit that advances the folding-back member.

4. The braid folding-back apparatus for the end portion of the coaxial electric wire according to claim 3, wherein the second braid opening unit mounted on the unit main body includes a slide rod that penetrates the rotation body and is slidably disposed on the work axis while being guided by the rotation body, the opening pipe provided on a front end of the slide rod, and a slide drive mechanism that moves the slide rod forward and backward.

5. The braid folding-back apparatus for the end portion of the coaxial electric wire according to claim 4, wherein the rotation drive mechanism, the opening and closing drive mechanism, the slide drive mechanism, and the unit main body drive mechanism are respectively configured with air-driven actuators.

* * * * *